Figure 1:
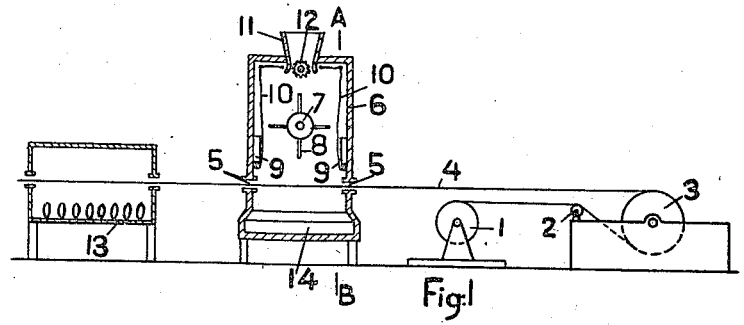

Sept. 4, 1923.

C. ECKERT 1,466,821

APPARATUS FOR BESTREWING OR COATING ARTICLES OF MANUFACTURE WITH
BRONZE OR OTHER PULVERULENT COLORS

Filed April 17, 1922

Inventor:
Carl Eckert
By: *Hubert S. R.*
Attorney.

Patented Sept. 4, 1923.

1,466,821

UNITED STATES PATENT OFFICE.

CARL ECKERT, OF BERLIN-NEUKOLLN, GERMANY.

APPARATUS FOR BESTREWING OR COATING ARTICLES OF MANUFACTURE WITH BRONZE OR OTHER PULVERULENT COLORS.

Application filed April 17, 1922. Serial No. 554,018.

*To all whom it may concern:*

Be it known that I, CARL ECKERT, a citizen of the German Republic, and a resident of Berlin-Neukolln, Germany, have invented a certain new and useful Improved Apparatus for Bestrewing or Coating Articles of Manufacture with Bronze or other Pulverulent Colors (for which I have filed applications in Germany on November 13, 1920, April 1, 1921, and April 13, 1921; in Austria on March 20, 1922; in Switzerland on March 20, 1922; in Hungary on March 23, 1922; in France on March 25, 1922, Patent No. 549,366, granted on November 17, 1922; in Netherlands on March 25, 1922; in Norway on March 28, 1922; in Great Britain on March 29, 1922; in Sweden on April 1, 1922; in Spain on April 1, 1922, Patent No. 81,288, granted on July 8, 1922; and in Italy on April 27, 1922), of which the following is a specification.

This invention relates to an apparatus by which articles of manufacture shall be bestrewn or coated with bronze or other pulverulent colors. Articles of the kind intended are, in the first place, paper, especially parchment paper, either in single sheets or in tracts, furthermore flat objects, such as sheets or leaves of tinfoil, glass plates, ledges and frames for pictures and the like. Such objects shall be coated quite thinly and uniformly, without any necessity of touching the respective surface with the hand.

Bronzing surfaces, for instance in the manufacture of metal paper, impress paper, and the like, has been effected up to now in this way that the paper was coated with a solution of a resin or wax or the like, the dissolvent being benzine, benzole, spirit or the like. The solution was applied to the paper with aid of any of the devices known for such a purpose and the dissolvent was allowed to vaporize, after which the bronze or other color was applied to the resinous or waxy layer remaining upon that surface. The bronze, etc., was applied by means of plush rollers or the like, and making it adhere to said layer was effected by slightly heating it shortly before. The bronze-covered paper was then passed through between hot calendering rollers whereby the bronze was pressed against its base as well as smoothened.

The papers, etc., treated in this way had, furthermore, to undergo a rather circumstantial after-treatment. Besides this undesired-for addition, there were the particularly felt disadvantages that the bronze, etc., was uniformly applied and comparatively large quantities of it were lost. This latter drawback is met with also in that known method in which the bronze, etc., is mixed with a liquid and the mixture is applied to the paper, etc., by means of a brush or a special device.

In contradistinction to those known procedures and the means for carrying them into effect, the subject-matter of the present invention lies in the following features: The paper or other article of manufacture is passed through a casing into which the bronze or other pulverulent color is introduced by means of a roller and within which the bronze, etc., is finely distributed by means of rotating wings which receive the bronze, etc., from the supply roller and whirl it about, the thus produced dust precipitating then uniformly upon the paper, etc., which is passed through that casing with an appropriate speed.

There are, besides this general feature, several special ones, which are described hereinafter.

Figure 2:
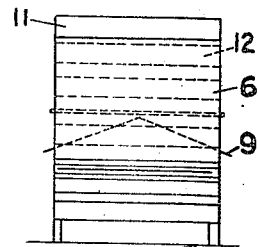
Figure 3:
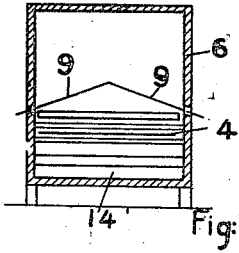
Figure 4:
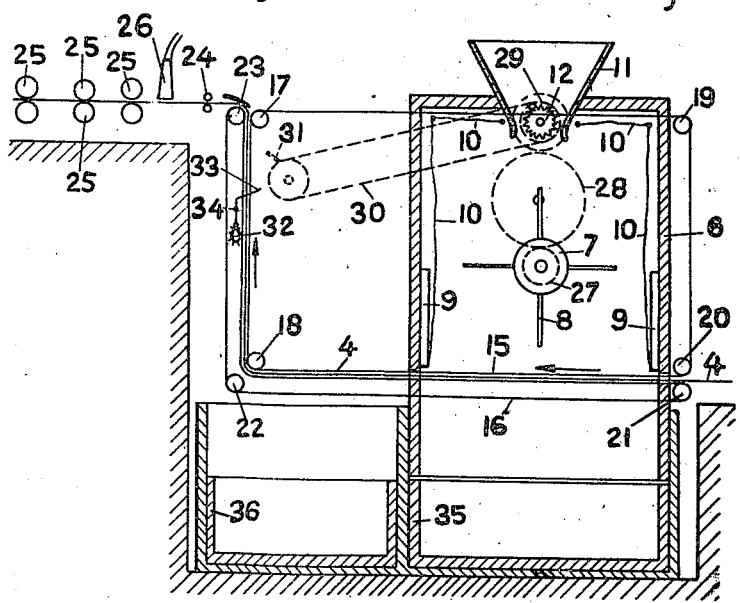

In order to make my invention more clear, I refer to the accompanying drawing, in which similar numbers of reference denote similar parts throughout the several views, and in which Fig. 1 is a diagrammatical illustration of a complete plant furnished with the apparatus forming the subject-matter of this invention, this apparatus and a drying device (at the left hand portion of Fig. 1) being shown in vertical section. Fig. 2 is a side-view of the bronzing apparatus per se, seen from the left hand side. Fig. 3 is a vertical section through the same apparatus in line A—B of Fig. 1, also seen from the left side. Fig. 4 is a vertical longitudinal section through a modified form of construction, drawn on a larger scale.

The tract of paper 4 comes from a roll 1 and is led over small guide roller 2 and a large guide roller 3 which dips into a receptacle containing a weak resin or wax solution. The level of the solution is kept below the line of contact between the paper and the roller 3 so that the paper is moistened only at that surface which afterwards is the upper one. Also the solution is weak anyhow, its strength is such that it is sufficient for the purpose in view. The moistened paper passes through slots 5 into, and out of, a casing 6 which is provided on its top with a hopper 11, the lower end of which encloses a strewing roller 12, which rotates with a moderate speed. The means for effecting this are omitted in Fig. 1. The bronze supplied by the roller 12 falls upon quickly rotating wings 8 extending radially forth from a cylindrical carrier 7. The bronze is whirled about in the casing 6 by the wings 8, the casing being, thus, filled with bronze dust, of which those particles that contact with the moistened paper surface adhere to it. The paper is drawn uniformly and with moderate speed through the casing 6, and the bronze settles uniformly upon it so that the paper is uniformly coated with it.

The wings 8 consist preferably of wire gauze whereby the fine distribution of the pulverulent bronze within the casing 6 is considerably promoted. The bronze particles adhering to the layer of moisture upon the paper penetrate into, and sink down in it until they contact with the paper itself. The moisture, i. e., the solution of the resin or wax or the like, encloses, thus, those particles completely. It is, consequently, unnecessary to coat the layer of bronze with a second layer of moisture, as formerly frequently done in order to prevent the bronze, etc., from getting off its base.

13 (Fig. 1) is a drying device which, in the example shown, is heated with gas and serves for drying the bronzed or otherwise colored paper.

As the fine bronze dust might adhere to the inner walls of the casing 6, from which it could fall down in comparatively thick layers, the walls are covered with sheets of paper 10 which, however, hang loose so as to be able to flutter, whereby adhering of the bronze dust to the casing walls in general and to the paper in particular is effectively prevented. That small amount of bronze dust which finds access into the spaces between the walls of the casing and the paper drops from time to time upon oblique ledges 9 upon which it glides down into boxes or other receptacles (not shown in the drawing) provided at the outside of the casing.

Another small amount of bronze dust may get into the space below the paper. This space may contain a drawer or the like (for instance as 35, Fig. 4) in which that dust is collected and by means of which it is removed from time to time in order to be reintroduced into the hopper 11, the fact being, that this dust is not in the least soiled.

Regulating the quantity of bronze and, thus, the thickness of the layer upon the paper may be effected by changing the speed of the supply roller 12.

Instead of employing only one such apparatus as shown in the middle portion of Fig. 1 (the casing 6 with its operating parts), there may be two such apparatus or casings, etc., which are arranged in series and of which the first serves for distributing finely pulverized resin exactly in the manner described with respect to the bronze, and with the same means, whereas the second is employed for the pulverulent bronze. The paper receives, thus, first a lower layer of the resin and then an upper layer of the bronze. The thus covered paper is especially suited for impresses, for instance in bookprinting, which are made by having the paper acted on by hot impressing dies or stamps. Passing the paper through a solution of a cementing medium may be dispensed with in this case.

If glass plates are provided, in the manner described, with layers of bronze or another color, these layers may then be drawn off their glass bases and separately used.

Instead of a resin or wax also other agglutinants may be made use of, for instance paste or another mixture of water and a cementing medium soluble in it and not apt for transference by a roller because such a one would get glued up. Proceeding in the just-mentioned way is especially suited for the manufacture of cheap gold-paper.

Referring now to Fig. 4, this shows a combination of the casing 6 and its operating parts with means by which an excess of bronze applied to the paper may be removed from this latter and re-employed. It is, in this instance, presupposed that the paper has been but very slightly moistened and comparatively much bronze or the like has been strewn upon it. The tract of paper is moved by endless bands 15 and 16, the first being guided by rollers 17, 18, 19, 20, the second by rollers 21, 22, 23 and the roller 18. The tract of paper is, thus, guided at its upper surface, as well as at its lower one. The arrows show the direction of motion of the endless bands and, thus, of the paper, too. Having left the roller 23 the paper passes through between one pair of rollers 24 and a plurality of pairs of rollers 25, for instance three, as in the drawing. There are, in fact, two bands 15 and two bands 16, namely two parallel bands 15 and two parallel bands 16 which engage the paper merely at its rims, the intermediate space or surface remaining uncovered because it is to receive the bronze or other color.

An important feature of this form of construction resides in the feature that the paper after having left the roller 18 is guided upwards in an oblique or vertical direction so that the excess of bronze, etc., falls off and down. This may be promoted by a beating or vibrating member 32 which, in the example illustrated, is suspended between pivots 34 and provided with an upper extension 33 co-operating with a rotating lug 31 projecting forth from a chain wheel 37 driving the supply roller 12 by the mediation of a chain 30 and another chain wheel 29.

The excess of the pulverulent bronze thus removed from the paper is collected in a receptacle 36 and then again utilized. Eventual remainders of the excess of bronze upon the paper may be sucked off by a pneumatic suction nozzle 26 located between the guide rollers 24 and the first pair of the rollers 25. These latter rollers, all of them, are plush rollers which effect an ultimate very fine distribution of the bronze, etc., and remove the very last remainders of the excess.

The apparatus shown in Fig. 4 is especially suited if the paper before entering into the casing 6 has been provided with an agglutinant only at certain places which are just those to be covered or coated with the bronze, etc., whereas the other portions of the surface are to remain uncovered or uncoated. The beating or vibrating member 32 removes the bronze, etc., from these latter portions. Hot impressing dies or stamps need not be employed to make the bronze, etc., firmly adhere to the other ones.

Having now described my invention, what I claim as new and desire to secure by Letters Patent of the United States is:

1. An apparatus for bestrewing or coating articles of manufacture with bronze or other pulverulent colors, comprising in combination a closed casing having oppositely located lateral apertures; a supply roller at the top of the casing; a distributing member within said casing below the supply roller; flexible sheets arranged at the inner walls of the casing opposite to the distributing roller; and means for making the article to be bestrewed or coated pass through said apertures into and out of the casing.

2. An apparatus for bestrewing or coating articles of manufacture with bronze or other pulverulent colors, comprising in combination a closed casing having oppositely located lateral apertures; flexible sheets arranged at the inner walls of said casing and being adapted to flutter; oblique ledges arranged between the casing walls and the flexible sheets and extending outwards of the casing; a supply roller at the top of the casing; a distributing fan within said casing below the supply roller; and means for making the article to be bestrewed or coated pass through said apertures into and out of the casing.

3. An apparatus for bestrewing or coating articles of manufacture with bronze or other pulverulent colors, comprising in combination a closed casing having oppositely located lateral horizontal slots; a supply roller at the top of the casing; a distributing device within said casing below the supply roller; flexible sheets arranged at the inner walls of the casing opposite to the distributing device; oblique ledges arranged between the casing walls and the flexible sheets and extending outwards of the casing, and means for making a tract of paper pass through said slots into and out of the casing.

4. An apparatus for bestrewing or coating articles of manufacture with bronze or other pulverulent colors, comprising, in combination: a closed casing having oppositely located lateral apertures; a supply roller at the top of the casing; a hub within said casing below the supply roller, and distributing wings attached to said hub; flexible sheets arranged at the inner walls of the casing opposite to the distributing wings; and means for making the articles to be bestrewed or coated pass through said apertures into and out of the casing.

5. An apparatus for bestrewing or coating articles of manufacture with bronze or other pulverulent colors, comprising, in combination: a closed casing having oppositely located lateral apertures; a supply roller at the top of the casing; a hub within said casing below the supply roller, and wings attached to said hub and consisting of a material adapted to let the bronze or the like pass through; flexible sheets arranged at the inner walls of the casing opposite to the distributing wings; and means for making the article to be bestrewed or coated pass through said apertures into and out of the casing.

6. An apparatus for bestrewing or coating articles of manufacture with bronze or other pulverulent colors, comprising, in combination: a closed casing having oppositely located lateral apertures; a supply roller at the top of the casing; a hub within said casing below the supply roller, and wings attached to said hub and consisting of wire gauze; flexible sheets arranged at the inner walls of the casing opposite to the distributing wings; and means for making the article to be bestrewed or coated pass through said apertures into and out of the casing.

7. An apparatus for bestrewing or coating articles of manufacture with bronze or other pulverulent colors, comprising, in combination: a closed casing having oppositely located lateral apertures; a supply roller at the top of the casing; a hub within said casing below the supply roller, and distributing wings attached to said hub; flexible sheets arranged at the inner walls of the casing opposite to the distributing wings; means for making the article to be bestrewed or coated pass through said apertures into and out of the casing; and means for guiding the treated article vertically upwards outside of the said casing.

8. An apparatus for bestrewing or coating articles of manufacture with bronze or other pulverulent colors, comprising, in combination: a closed casing having oppositely located lateral apertures; a supply roller at the top of the casing; a hub within said casing below the supply roller, and distributing wings attached to said hub; flexible sheets arranged at the inner walls of the casing opposite to the distributing wings; means for making the article to be bestrewed or coated pass through said apertures into and out of the casing; and means for guiding the treated article vertically upwards outside of the said casing; and a vibrating device so arranged as to act on the vertically guided part of the treated article.

9. An apparatus for bestrewing or coating articles of manufacture with bronze or other pulverulent colors, comprising, in combination: a closed casing having oppositely located lateral apertures; a supply roller at the top of the casing; a hub within said casing below the supply roller, and wings attached to said hub and consisting of a material adapted to let the bronze or the like pass through; flexible sheets arranged at the inner walls of the casing opposite to the distributing wings; means for making the article to be bestrewed or coated pass through said apertures into and out of the casing; rollers so arranged outside the casing as to conduct the treated article vertically upwards; and a beating device arranged between the lower and the upper rollers and adapted to operate on the respective part of said article.

In testimony whereof I affix my signature in presence of two witnesses.

CARL ECKERT.

Witnesses:
  E. H. SHERMAN,
  R. T. AUSPAUER.